June 21, 1960  F. L. ZYBACH  2,941,727
SELF-PROPELLED SPRINKLING IRRIGATING APPARATUS
Filed June 15, 1953  5 Sheets-Sheet 1
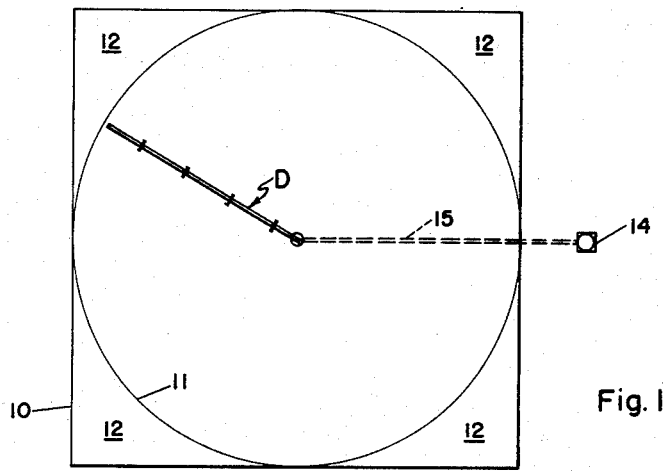
Fig. 1
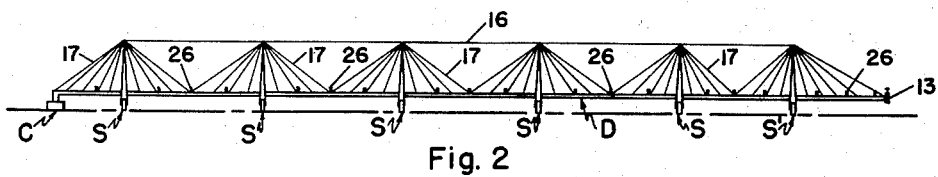
Fig. 2
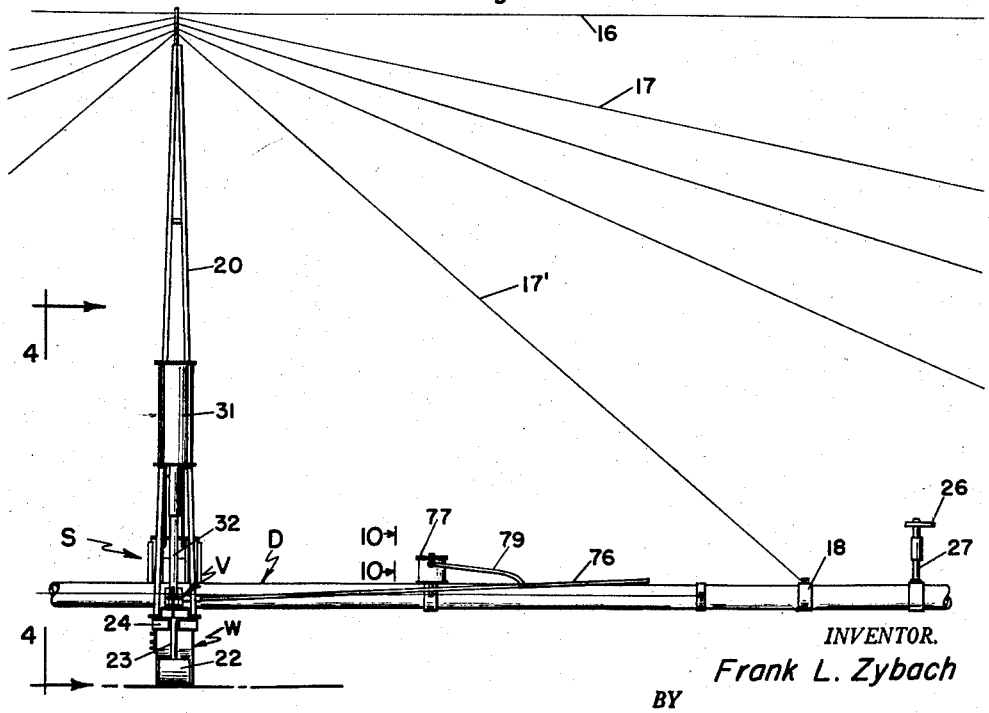
INVENTOR.
Frank L. Zybach
BY
Horace B. Van Nachenburgh
ATTORNEY June 21, 1960

F. L. ZYBACH 2,941,727

SELF-PROPELLED SPRINKLING IRRIGATING APPARATUS

Filed June 15, 1953

INVENTOR.
Frank L. Zybach
BY
Horace B. Van Valkenburgh
ATTORNEY

June 21, 1960   F. L. ZYBACH   2,941,727
SELF-PROPELLED SPRINKLING IRRIGATING APPARATUS
Filed June 15, 1953   5 Sheets-Sheet 3

INVENTOR.
Frank L. Zybach
BY
Horace B. Van Valkenburgh
ATTORNEY

June 21, 1960   F. L. ZYBACH   2,941,727
SELF-PROPELLED SPRINKLING IRRIGATING APPARATUS Filed June 15, 1953   5 Sheets-Sheet 4

INVENTOR.
Frank L. Zybach
BY
Horace B. Van Valkenburgh
ATTORNEY

June 21, 1960 F. L. ZYBACH 2,941,727
SELF-PROPELLED SPRINKLING IRRIGATING APPARATUS
Filed June 15, 1953 5 Sheets-Sheet 5

INVENTOR.
Frank L. Zybach
BY Horace B. Van Valkenburgh
ATTORNEY

United States Patent Office 2,941,727
Patented June 21, 1960

2,941,727
SELF-PROPELLED SPRINKLING IRRIGATING APPARATUS

Frank L. Zybach, Strasburg, Colo.

Filed June 15, 1953, Ser. No. 361,808

19 Claims. (Cl. 239—177)

This invention relates to sprinkling and irrigation apparatus, and more particularly to self-propelled apparatus for sprinkling or irrigating relatively large sections of land or the like, and valves adapted to be utilized therein. The present invention is related to the invention of my U.S. Patent No. 2,604,359, granted July 23, 1952, and entitled "Self-Propelled Sprinkling Irrigating Apparatus."

In sections of the country where the natural rainfall is not sufficient to cause a maximum growth of crops, it is often desirable and sometimes absolutely necessary to provide additional water. This water may be taken from a river or lake, perhaps some distance away from the field in which the crops are being grown, and carried through a ditch or the like to the field. Or, the water may be obtained from an artesian well or other underground source, the well sometimes developing sufficient pressure to make pumps unnecessary, although water from an underground table usually must be pumped. In the normal manner of irrigation with water from a ditch, the water is directed along successive lateral ditches, such as between rows, and in effect floods the area being irrigated. This method is usually satisfactory in the case of crops having considerable distances between the rows, such as sugar beets, but in the case of wheat and other more closely spaced crops, the irrigating ditches may occupy an undue portion of the land. Furthermore, the contour of the land is often such that satisfactory irrigation by ditches is quite difficult. This method also tends to be unduly wasteful of water, such as from runoff and evaporation from pools.

Water supplied from a well can be distributed to a desired tract of land by irrigation ditches, but more effective and adequate watering can be accomplished by sprinkling the water onto the land. Sprinkling tends to produce more of a soaking effect, such as in the case of natural rainfall, and greater benefits are usually obtained by sprinkling with smaller amounts of water for a longer period of time. Stationary sprinkling systems have proven practical for intensely cultivated land, more particularly when flowers, vegetables and similar horticultural varieties are being grown, but such stationary systems often interfere seriously with cultivation, and also are very expensive to install on relatively large tracts of land, such as a quarter section or the like.

Also, a supply pipe has been laid across a field, and individual sprinkling pipes connected thereto at various points, the sprinkling pipes being set up for successive areas. However, the position of the pipes must be changed for each new area to be sprinkled, the workmen must walk through the muddy ground to reach the pipes, substantially the full time of two or more workmen is required, and the task becomes more difficult as the crop grows higher.

It has been proposed to take water from an artesian well, or water pumped from a well to the center of a field to a central supply pipe and connect thereto a relatively long distributing pipe rotated about the central pipe as an axis, wheeled supports being placed at intervals along the distributing pipe. Previous driving or rotating mechanisms proposed have included sets of cables wound around drums, for pulling the pipe around various portions of the field, or internal combustion engines or electric motors at each of the supports. A rather complicated and cumbersome overhead trolley suspension system extending around the periphery of the field has also been proposed. All of these previous proposals have suffered from numerous disadvantages, such as the need for constant attention or abnormally high initial cost. In addition, since a distributing pipe pivoted at the center or a quarter section of land must be about 1320 feet long to reach the edge of the field at each side, previous distributing pipes, mounted on wheeled supports, have been subject to a further and serious disadvantage—lack of control of the relative position of the supports, as the result of a tendency for a support to run ahead or lag behind other supports, thus causing misalignment, strains in the pipe and undue strain or perhaps breakage of the pipe or associated parts.

In general, in sprinkling and irrigation apparatus for a relatively large section or tract of land constructed in accordance with the invention of my Patent No. 2,604,359, a distributing pipe is pivotally connected to a central supply pipe and is movable around the central pipe as an axis, while a plurality of supports are disposed at spaced positions along the distributing pipe and a plurality of discharge nozzles are also spaced along the distributing pipe for spraying water on the land as the distributing pipe moves around. Such apparatus includes water actuated drive means at the supports, which drive means are supplied with water from the distributing pipe and which preferably discharge exhaust water rearwardly and to one or each side. Such drive means may include a cylinder and piston to which water under pressure is supplied for movement in one direction, an exhaust line leading from the cylinder preferably being substantially larger than the inlet line, so that only one direction control valve, i.e., an exhaust valve, is necessary. Thus, when the exhaust valve is closed the piston will be pushed up and when the exhaust valve is open the piston will move down, the inlet line supplying water continuously but the water running out of the discharge line faster than it can come in when the exhaust valve is open.

Another improvement of my Patent No. 2,604,359 lies in a control device at each intermediate support, for automatically controlling the drive means in accordance with springing of the distributing pipe, due to unequal movement at the supports, and thereby maintaining the pipe in alignment. Such a control device may take the form of a tension cable attached to the pipe at a point spaced to each side of the support, and adapted to determine the position of a regulating valve which controls the amount of water supplied to the cylinder inlet line. The speed of one support, such as the support at the outer end of the distributing pipe, is adjusted independently or set by hand, so that this support will act as a "master support" and regulate the speed of the entire pipe. Additional improvements include the use of flexible joints at the supports when the distributing pipe itself is relatively inflexible, and an outer section which is provided with a valve, so that the corner of a rectangular area may be irrigated by flooding, by a separate sprinkling pipe, or in any other desired manner.

Since water from an irrigation ditch, which has flowed for any substantial distance therealong, usually carries a large amount of silt or debris, the apparatus of the present invention, similarly to the apparatus of my Patent No. 2,604,359, is particularly applicable to the distribution of water obtained from a well or other relatively clarified source, although not limited thereto.

Among the objects of the present invention are to provide novel irrigation or sprinkling apparatus, particularly useful for relatively large tracts of land; to provide such apparatus which is an improvement upon the apparatus of my Patent No. 2,604,359; to provide such apparatus which includes novel drive arrangements for the supports; to provide such apparatus wherein the water supply to the distributing pipe or also to the drive for the supports, and particularly a pump motor, may be automatically stopped in the event of undue misalignment of the pipe sections; to provide such apparatus which may be operated in either direction; to provide a novel control valve which is particularly adapted to be utilized with or incorporated in the apparatus of this invention; and to provide such apparatus which entails a minimum of operational and constructional difficulties.

Additional objects and the novel features of the present invention will be apparent from the more detailed description which follows, taken in connection with the accompanying drawings, in which Fig. 1 is a diagram, in a considerably reduced scale, of apparatus constructed in accordance with this invention, in a field to sprinkled or irrigated;

Fig. 2 is a front elevation, on a reduced scale, of a distributing pipe and the supports therefor;

Fig. 3 is a fragmentary elevation of a portion of the distributing pipe and one support therefor;

Figure 5:
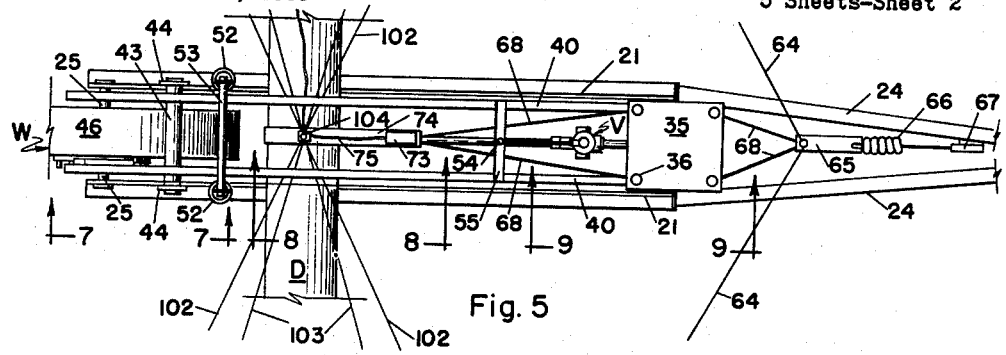
Fig. 5 is a top plan view on an enlarged scale, of the support of Figs. 3 and 4, taken from the position of line 5—5 of Fig. 4.

The apparatus of the present invention may operate generally in a manner similar to the apparatus of my Patent No. 2,604,359. Thus, as in Figs. 1 and 2, a relatively long distributing pipe D may be mounted on a plurality of supports S, and an outer support S', connected at the center of the field 10 to the central pipe C. The distributing pipe D may be supported at a convenient height, above ground level, such as from 2 to 6 feet, thereby passing over the crop when grown. The connection between central pipe C and and the rotating distributing pipe D, may be a suitable sealing connection, such as of the type illustrated in Fig. 3, as described later. When rotated around the central pipe C, the outer end of the distributing pipe D will traverse a circular path, such as around circle 11, to spray water on all of the land enclosed within circle 11. When the field 10 is square, as shown, the corners 12 are outside circle 11 and will be unwatered by rotation of pipe D, but the corners are very readily watered from a valve 13 at the end of pipe D, as hereinafter described. The central pipe C may be supplied from a well or other source of relatively clear water, i.e. free of floating debris or undue amounts of silt, sand, gravel or the like. If possible, the well is drilled at the center of the field 10, and if an artesian well and the water pressure is sufficient, no pump will be necessary. If the pressure is not sufficient, then a pump must be used, which may be a conventional deep well pump or a pump having an intake in a pond supplied from a well, such as a pump 14. When the pump, such as pump 14 is located outside the field, a pipe 15 leads from the well to the central pipe C and is preferably buried sufficiently deep so as not to be damaged or dislodged by plowing, cultivating or the like. Also, electric wires between the pump and the apparatus may be buried in a ditch, plowed for the purpose, and the ground then turned thereover.

For longitudinal stability, the tops of the supports S and S' may be connected by a horizontal wire 16, while slanting wires, such as wires 17 and 17' of Fig. 3, may extend from the top of each support to spaced points along the pipe to each side of the support and to points midway to the next support, each wire 17 or 17' being conveniently attached to the pipe at a collar 18. The wires 16, 17, and 17' may be connected to the top of a tower, such as including vertical spars 19 and slanting spars 20, braced in a suitable manner and mounted, as in Fig. 4, on parallel beams or angles 21 of a framework which is supported at one end by a skid 22 and at the opposite end by a drive wheel W, usually operated in a direction to pull skid 22 behind it, but operable in either direction so that skid 22 is preferably upturned at each end. A post 23 extends upwardly from skid 22 and is attached to the ends of a pair of converging beams or angles 24, attached at their opposite ends to beams 21. Axles 25, about which wheels W are rotatable, may extend between the front ends of beams 21, while the wheels W and skids 22 are preferably sufficiently wide to support the weight of a section of pipe D, such as 200 feet long, but preferably are made as narrow as possible to reduce the area of growing crop which may be prevented from growing by the wheels. Pipe D, which may consist of a number of sections coupled together, may be light metal tubing, such as aluminum and rests on beams 21.

Figure 12:
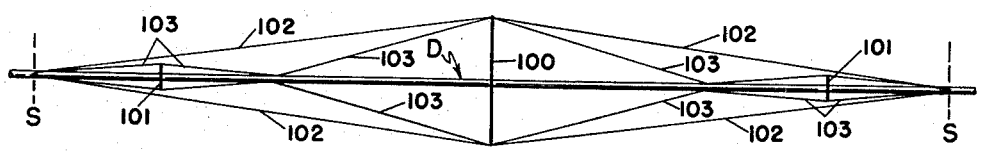
Fig. 12 is a top plan view of a portion of the distributing pipe between supports, illustrating a lateral bracing arrangement.

Lateral stability of the pipe may be enhanced by a system of lateral bracing wires, as shown in Fig. 12 and described later, while the top wire 16 permits the wires 17 and 17' at the outer support S' to support the overhanging, outer end of the pipe D adequately.

A plurality of sprinkling heads 26 may be mounted on pipes 27, disposed at suitable spaced distances along the pipe D, and may be of any suitable type, such as rotatable by reaction of the water discharging therefrom. Each such sprinkling head covers a circular area, and the amount of water discharged by each may be adjusted so that the heads closer to the center, which move around a smaller circle, will discharge less total water, because of the smaller area to be covered. The pipe D is preferably of a sufficient diameter, such as six inches, to provide a reservoir of water which therefore may be a low pressure, such as 25 pounds per square inch, so that the pressure at each of the heads 26 will be substantially the same. The heads 26 preferably do not discharge large volumes of water, but merely enough to approximate a light to medium rainfall, so that as the pipe D is rotated slowly around the field, the water will have an opportunity to soak into the ground without forming a great number of pools, from which an undue amount of water may tend to evaporate. Thus, to adequately water the field, it may be necessary for the pipe D to consume a number of days, to traverse the field completely. In fact, it is contemplated that the apparatus can be set in motion and run continuously for several days or weeks, so that by the end of that time the field will be adequately watered. The apparatus is particularly adapted for use with wells having a relatively small rate of flow, such as on the order of 200 gallons per minute. When the end of pipe D reaches any of the corners 12, or at any other desired time, all of the sprinkling heads may be shut off and the apparatus stopped. Then a separate sprinkling pipe or hoses may be connected to the end valve 13, which may then be opened to permit the corner 12 to be watered. Or, if the slope and configuration of the land is amenable thereto, the end valve 13 may merely be opened and the corner irrigated. As soon as one corner has been irrigated or sprinkled, the apparatus may be started, and the pipe permitted to continue sprinkling while moving around to the next corner 12. If desired, the corners need not be irrigated, or a special sprinkling attachment may be used which will cover a majority of the corner, but perhaps not all. It will be evident, of course, that the corners 12 must be sprinkled or irrigated by additional operations but the time and difficulty involved is much less than would be required to sprinkle or irrigate the entire field, and a considerable saving in time and effort is made, particularly since the device may be left operating automatically for many hours or days and nights at a time and without any attention on the part of the operator.

Figure 4:
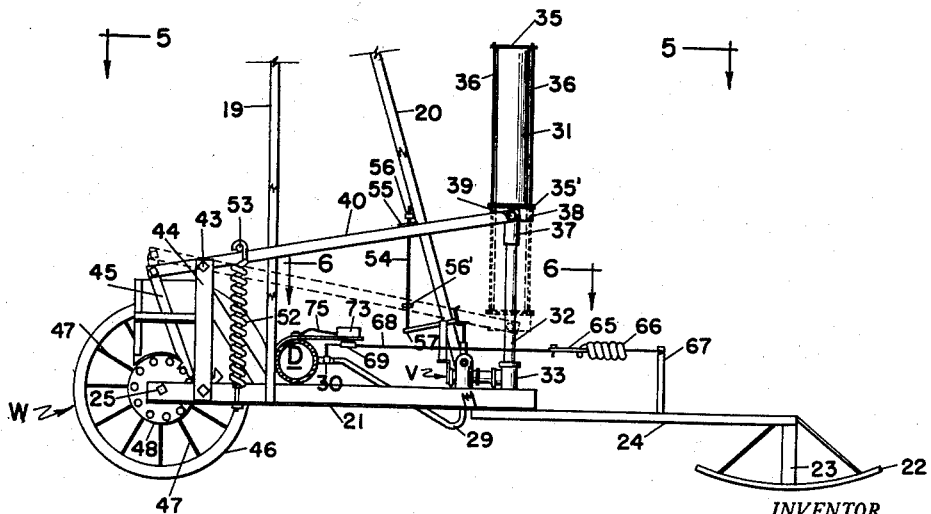
Fig. 4 is a side elevation of the support of Fig. 3, the distributing pipe being in section along line 4—4 of Fig. 3.
Figure 9:
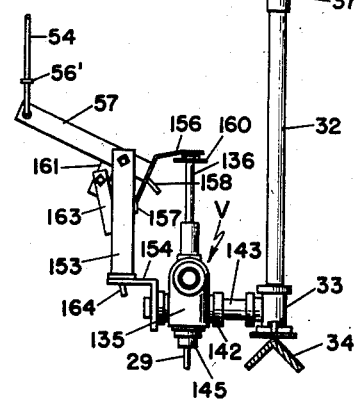
Fig. 9 is a fragmentary elevation, taken from the position of line 9—9 of Fig. 5.

Each of the supports S, and also the support S', may be driven by a water actuated, reciprocating drive, the water therefor being supplied from distributing pipe D through an inlet line 29 controlled by a valve 30 of Fig. 4 and leading to a special valve V. Each of the drives for the supports, as in Fig. 4, may include a cylinder 31, movable upwardly and downwardly between the full and dotted positions of Fig. 4 on a hollow piston rod or pipe 32, which is stationary and extends upwardly from an L 33, mounted on a cross bar 34, as in Fig. 6 and connected with valve V. Cylinder 31, as in Fig. 9, may be clamped between plates 35 and 35' by bolts 36, lower plate 35' being provided with a guiding collar 37, and also attached to an angle 38 on each side, each of the latter being pivotally connected by a pin or bolt 39 to a lever 40. The upper end of piston rod 32 is provided with a piston formed in a suitable manner, as by a sealing ring 41 formed of leather, rubber or other suitable material and clamped between metal rings 42. Water is supplied to the interior of cylinder 31, and also drained therefrom, through piston rod or pipe 32, and the cross-sectional area of cylinder 31 is preferably relatively large, compared with that of line 29, so that water supplied through line 29 to the interior of cylinder 31 will cause the cylinder to rise slowly. For each of the supports S, the valve 30 is automatically controlled, as in accordance with the springing or bending of the pipe D, while the valve 30 for the end support S' is manually adjustable, to a flow which will produce approximately the desired speed of traverse, such as one complete revolution around the field in a time which corresponds to the amount of water to be sprinkled onto the field. As indicated previously, such time may vary between a few days and several weeks.

Levers 40 are pivoted on a pin 43 which extends horizontally between a pair of upright brackets 44, mounted on the beams 21, and the overhanging end of each lever 40 is pivotally connected to the upper end of an arm 45 which is adapted to turn the wheel W. The wheel W, as in Fig. 4, may comprise a rim 46, supported by spokes 47 which extend from a hub rotatable about axle 25, shown in Fig. 5, and is provided at each side with a circular disc 48, having laterally extending studs 49. The lower end of each arm 45 is adapted to turn the wheel W by engagement with the studs 49, each arm 45, as in Fig. 7, being provided with a transverse shoulder 50 and a wide angle notch 51 thereabove. As will be evident, when the arm 45 is moved downwardly as the cylinder 31 of Fig. 9 rises, due to water flowing into the interior thereof, the shoulder 50 will push downwardly on one of the studs 49, to turn the disc 48 in the direction of the arrow of Fig. 7, and the wheel with it. When the cylinder reaches the end of its upward stroke, and then starts down, the arm 45 will be lifted, the lower portion of arm 45 sliding along the previously engaged stud 49 until the rounded lower end thereof moves inwardly along the upper surface of the stud. The lower surface of notch 51 will then engage the next stud above, and further upward movement of the arm will permit the lower end of arm 45 to swing inwardly to move shoulder 50 slightly above the next stud to be engaged. By this time, cylinder 31 will have reached the end of its downward stroke, and when it starts on its next upward stroke, the arm 45 will be moved downwardly, with the shoulder 50 pushing against the then engaged stud 49. A spring 52, as in Figs. 4 and 5, is attached at its lower end to each beam 21 and at its upper end to a rod 53 which extends across the levers 40, rearwardly of the brackets 44, so as to tend to pull lever 40 and cylinder 31 downwardly, from the full to the dotted position of Fig. 4. Water pressure supplied to the interior of cylinder 31, during its upward stroke, is sufficient to overcome the pressure of springs 52, as well as to turn the wheels W.

Valve V may be moved to its different control positions through a rod 54 which extends through a bracket 55 fastened across levers 40, as in Fig. 4, and is provided with stops 56 and 56', adjacent its upper and lower end, respectively. The lower end of rod 54 is pivotally attached to an operating lever 57 of the valve V, so that as the cylinder 31 moves upwardly to the full position of Fig. 4, it will pull the rod 54 and lever up, and as it moves downwardly to the dotted position of Fig. 4, it will push the rod 54 and lever 57 downwardly. These shifts in the position of lever 57 change the valve V between positions for flow of water into cylinder 31, and discharge of water from the cylinder, in a manner described later.

Figure 7:
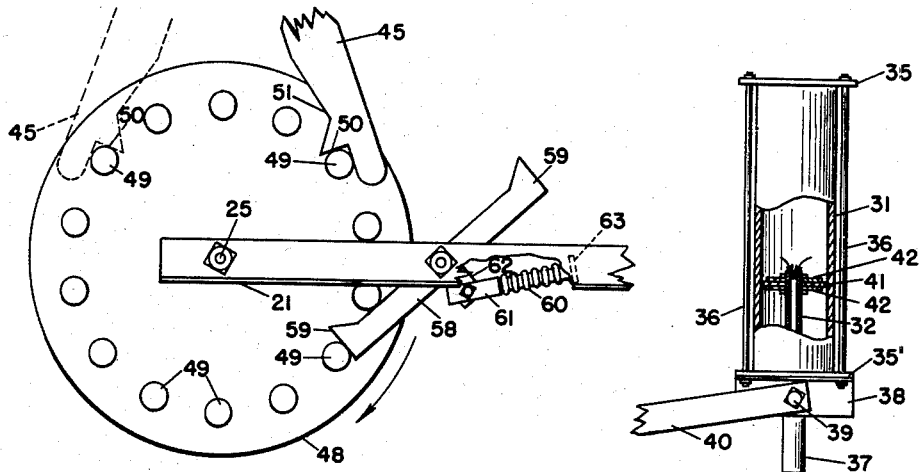
Fig. 7 is a front elevation on an enlarged scale of a portion of a drive wheel of the support of Figs. 3, 4 and 5, taken from the position of line 7—7 of Fig. 5.

Wheel W is prevented from moving backward during the downward stroke of the cylinder 31 and the lifting of arm 45, by a dog 58 which is pivotally mounted, as in Fig. 7, on the inside of beam 21 and is provided with a lateral, angular point 59 at each end. The inner edge of dog 58 is held against one of the studs 49 by a compression spring 60 which may surround a bar 61 pivotally attached to a link 62 which is fixed to dog 58. Bar 61 is movable through a hole in a bracket 63, attached to the inside of beam 21, one end of spring 60 bearing against bracket 63. As will be evident from Fig. 7, during movement of disc 48 in the direction of the arrow thereof, the stud 49 which is above the stud against which the lower end of dog 58 bears, will slide along the inner surface of the dog, and past the point 59, as the arm 45 moves downwardly. When the disc 48 has been turned through an arc equivalent to the distance between two adjacent studs 49, the next stud above will move past the dog point 59, whereupon the lower end of the dog 58 will snap into the position shown in Fig. 7, with the lower end bearing against a stud 49 and the inner edge bearing against the stud next above. As will be evident from Fig. 7, this position of the dog will prevent the disc 48, and the wheel W therewith, from turning backward during movement of the arm 45 to the next stud 49.

For reversing the movement of the supports S and S', it is necessary only to reverse the positions of the arms 45 and the dog 58. In such reverse position, the arm 45 faces in the opposite direction to that shown in Fig. 7, and the shoulder 50 will engage a stud 49 on the opposite side of the disc 48, as in the dotted position of Fig. 7. As will be evident, when the arm 45 is then moved downwardly, the disc 48 and the wheel W with it, will be turned in a direction opposite to the arrow of Fig. 7. The dog 58, in reverse position, is merely turned so that the bar 61 and link 62 are above, rather than below, the pivot point of the dog, so that the upper end of the dog will engage the underside of a stud above beam 21, rather than the lower end of the dog engaging the top of a stud 49 below beam 21. Thus, when the disc 48 is rotated in the opposite direction, by the arm 45 in the dotted position of Fig. 7, the dog in reverse position will again prevent backward rotation, but its upper end will move past each stud 49 in succession.

Figure 8:
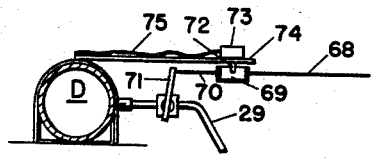
Fig. 8 is a fragmentary, vertical section, taken along line 8—8 of Fig. 5.

The relative speed at which each support S is driven is preferably controlled automatically, so as to maintain distributing pipe D in lateral alignment. As indicated previously, the difference between the supports S and the support S' is that the control valve 30 of each support S is controlled automatically, whereas the valve 30 for the support S' is set manually to determine the speed of rotation of the distributing pipe D around the field. The valves 30 of the supports S may be controlled automatically in a manner similar to that disclosed and claimed in my Patent No. 2,604,359, namely in accordance with the springing or bending of the distributing pipe D at the respective supports. For this purpose, a wire or rod 64 of Figs. 5 and 6 may be connected at its center to a bar 65, with the ends of the wire 64 connected to the distributing pipe D at points preferably spaced equidistantly from the support S, on opposite sides thereof. The opposite end of bar 65 is connected to a tension spring 66, in turn connected to an upright bracket 67 mounted on one of the beams 24. As will be evident, if the support shown in Fig. 5 lags behind the supports to each side, or a support to one side thereof, the distributing pipe D will tend to bend, thus pulling the bar 65 forwardly or rearwardly, depending upon the direction of movement of the support. Such movement of block 65 is transmitted through a pair of rods 68, which pass around opposite sides of the drive means, as in Fig. 6, being bent to shape and sufficiently rigid to maintain their shape and the opposite ends of which are connected to a box 69. Box 69 is open at the top and is connected by a rod 70 to handle 71 for control valve 29, as in Fig. 8. Upon sufficient movement, the front or rear edge of box 69 will engage an operating lever 72 of a micro-switch 73, mounted on a bracket 74 which extends horizontally from distributing pipe D. Each micro-switch 73 is preferably of a type which is closed when the operating lever 72 is in a central position and is open when lever 72 is pushed to either side. As will be evident, normal misalignment of a particular support will cause the handle 71 of its valve 30 to be moved in an appropriate direction, to open or close the valve 30 and thereby speed up or slow down the movement of cylinder 31. However, if one of the supports should move so far ahead or behind an adjacent support that the front or rear edge of open box 69 moves operating lever of micro-switch 73 in either direction from the center, the micro-switch 73 will be turned off, to shut off the current flowing through wires 75, thereby stopping the pump 14. All of the micro-switches 73, mounted on the supports S, are connected in series through the wires 75, and also in series with a solenoid or other suitable device in a control circuit for pump 14. The wires 75 extend along the distributing pipe D, being attached thereto at suitable intervals, as by tape, and extend to the central pipe C, from which point they are preferably insulated against water and moisture, and are buried, such as alongside the pipe 15. This safety device, operating in conjunction with the means for controlling the speed of a support in accordance with the springing or bending of the pipe, is a valuable feature of the present invention.

Figure 6:
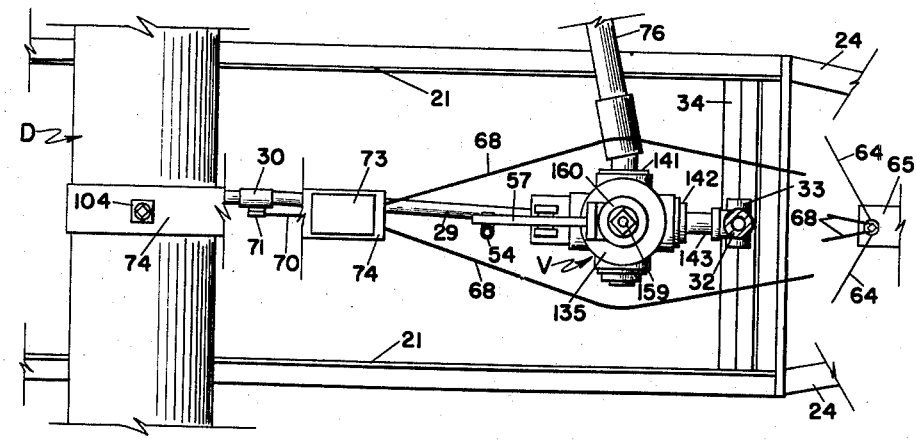
Fig. 6 is a fragmentary horizontal section on a further enlarged scale, taken along line 6—6 of Fig. 4.
Figure 10:
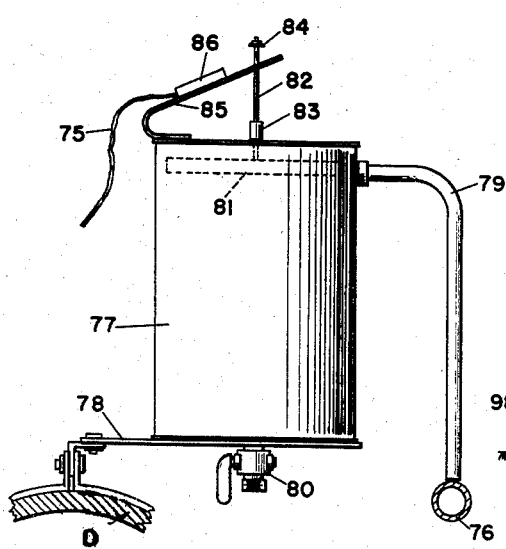
Fig. 10 is a fragmentary transverse vertical section, on an enlarged scale, taken along line 10—10 of Fig. 3.

The water for actuating the drive at each of the supports, as indicated previously, is supplied to the interior of the cylinder 31 through the valve V and the upright piston rod or pipe 32, and when the valve V is thrown to a discharge position, the water drains from the cylinder through the pipe 32 and through the valve V to a discharge pipe 76 of Figs. 3 and 6, which extends alongside the pipe D and discharges the water at a point remote from the support S. An additional safety feature may include a tank 77 mounted, as in Figs. 3 and 10, on a bracket 78 attached to the distributing pipe D, tank 77 being connected to the discharge pipe 76 by a small tube 79 at a point a sufficient distance from the end of the discharge pipe 76 that a small flow of water will be delivered to the tank 77. The tank 77 may be provided with a petcock 80 at the bottom, as in Fig. 10, and contains a float 81 from which a rod 82 extends upwardly through a collar 83 mounted on the top of tank 77. A stop 84 at the top of rod 82 is normally disposed above a spring lever 85, also mounted on top of the tank 77, on which is mounted a gravity mercury switch 86 which is connected by wires 75 in series with the micro-switch 73 of the respective supports S. Petcock 80, at the bottom of tank 77, is set to permit a small amount of water to drain continuously from the tank, so that if the water supplied to the tank decreases materially, the float 81 therein will drop as the level of water in the tank 77 drops. When the level of water in tank 77 drops sufficiently so that float 81 will fall to a lower level, stop 84 on rod 82 will pull lever 85 down, thus opening mercury switch 86, and stopping the pump 14, in the same manner as when any of the micro-switches 73 are turned off. This additional feature is utilized to stop the pump motor when the supply of water to the water drive mechanism fails, which may be for any number of reasons, such as that the intake at pump 14 is obstructed, the supply of water to pump 14 is unduly low, there is a break in the water line beyond pump 14, or the like. Usually, only one tank 77 need be utilized, preferably mounted adjacent either the support S' or the outer support S.

Figure 11:
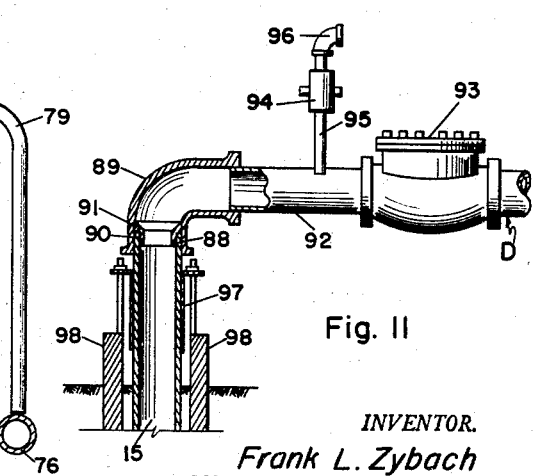
Fig. 11 is a fragmentary vertical section on an enlarged scale, taken at a central supply pipe of Fig. 2.

At the central supply pipe C, a rotatable connection to the distributing pipe D may be formed in the manner shown in my Patent No. 2,604,359, or in the manner shown in Fig. 11. Thus, the upper end 88 of supply pipe 15 may extend vertically upwardly into an L 89, at the center of rotation of the apparatus. The reduced lower end 90 of an annular rubber seal fits within the upper end 88 of pipe 15, while the enlarged upper end 91 of seal fits against the inside of L 89. The pressure of water pushes the seal outwardly against both the L 89 and pipe end 88 without leakage at the point of connection. At the other end of L 89, a nipple 92 may be connected for interposition of a non-return valve 93, connected to distributing pipe D, while a small pipe 94 may extend upwardly from nipple 92, for connection of a plug valve 95 adapted to discharge through an L 96, plug valve 95 being adapted to be opened when the apparatus is started up, to relieve undue pressure on the distributing pipe D and to permit air in the pipe 15 to escape. The vertical portion of pipe 15 may be supported in position by a sleeve 97 which is attached to posts 98 embedded in the ground.

Figure 13:
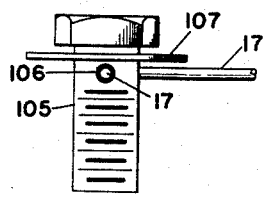
Fig. 13 is a side elevation of a wire tensioning bolt.
Figure 14:
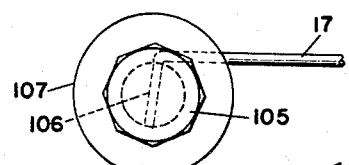
Fig. 14 is a top plan of the bolt of Fig. 13.

Lateral bracing for the distributing pipe D may be provided in a suitable manner, such as illustrated in Fig. 12, wherein a longer transverse spar 100 is mounted upon the pipe D at a position substantially midway between two supports S, with a shorter transverse spar 101 at each side of the spar 100, but preferably closer to the adjacent support. A pair of outer wires 102 extend from each support, on opposite sides of the pipe, and are connected at a central point to the ends of the spar 100, while a pair of inner wires 103 extend from each support on each side of the pipe D to the ends of the shorter spars 101, then cross under the pipe D and are also connected at their centers to the ends of the spar 100. It will be noted that the supports are omitted in Fig. 12, for clarity of illustration, the location of the supports S being indicated by the dotted lines, and that the connection of the wires 102 and 103 to the pipe D at a support S is shown in Fig. 5. The wires 102 and 103 may be attached in sections, or each wire may extend the full length of the pipe D. Thus, the wires 102 and 103 may be attached to the pipe at each support, such as by being attached by a clamp 104, as in Fig. 5. Whenever an end of a wire is to be attached to the pipe D or to any other desired part, a special clamping bolt 105, as illustrated in Figs. 13 and 14, may be utilized. Thus, the end of a wire, such as wire 17, or the ends of wires 102 and 103 at the ends of pipe D, may be inserted through a hole 106, the wire extending from the bolt beneath a washer 107. Then the bolt is turned to wrap the wire 17 therearound, until the desired tension is placed on the wire, whereupon a lock nut (not shown) or the like may be utilized to tighten the washer 107 against the wire 17, the wire, of course, being clamped between the washer and a flange, collar or other part to which the bolt 105 is attached. It will be understood, of course, that a bolt similar to bolt 105 of Figs. 13 and 14, may be substituted for the clamp 104 of Fig. 5, particularly if one or more of the wires is to be tightened at that point. Also, a separate clamp bolt may be utilized for each of the wires.

Figure 15:
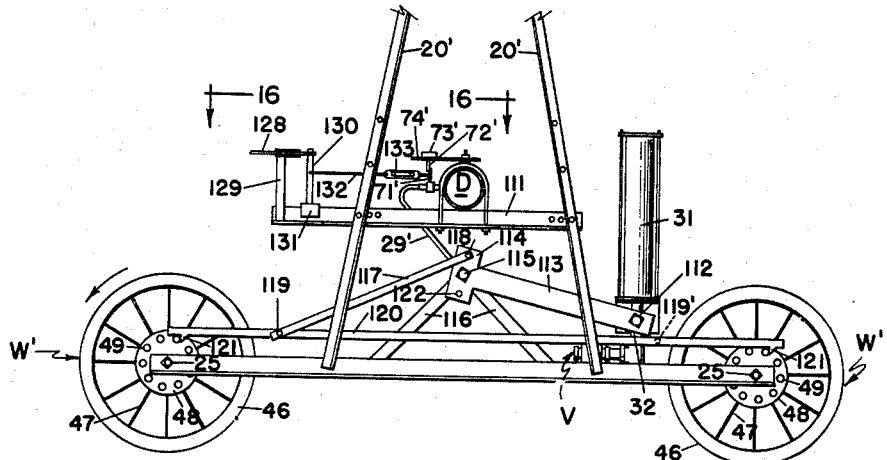
Fig. 15 is a side elevation of a support, alternative to the support of Fig. 4.
Figure 16:
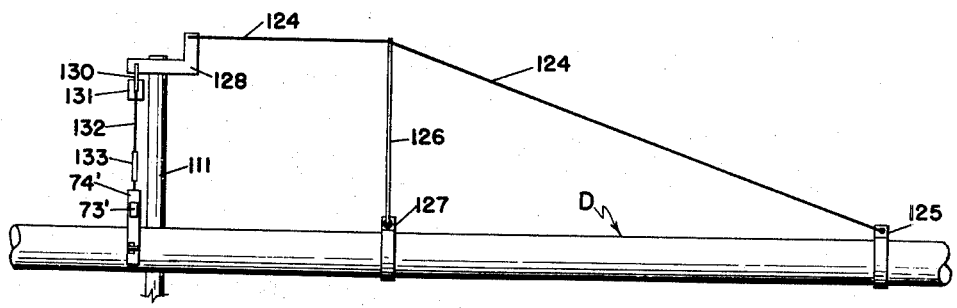
Fig. 16 is a top plan taken from the position of line 16—16 of Fig. 15, of a control device utilized in connection with the support of Fig. 15.

In the alternative support illustrated in Figs. 15 and 16, a pair of beams 110 extend between the axles 25 of a pair of wheels W', each of which is driven and which are similar in construction to the wheels W of the previous supports, except that only one disc 49 having studs 50 is provided, on the same side of each wheel W'. A tower formed by spars 20' supports the wires which uphold the distributing pipe D, in a manner similar to that previously described. The drive for the support of Fig. 15 may include a cylinder 31 reciprocable upwardly and downwardly upon an upright piston rod or pipe 32, as before, the pipe 32 being mounted between the beams 110. The direction of movement of cylinder 31 is controlled by a valve V, to which water is supplied through an inlet line 29', the flow being controlled by a valve 30, as before, and the water being supplied from distributing pipe D mounted on an angle 111 extending between spars 20'. The distributing pipe D thus may be mounted at a relatively high elevation, so as to insure passage over relatively high growing crops. The lower end of the assembly of cylinder 31 is pivotally connected by a pin 112 to a crank 113, which at its opposite end is provided with a double head 114 pivotally mounted on a pin 115, supported at the apex of a pair of inclined angles 116. For operating in one direction, to drive the wheels W' in the direction of the arrow, a link 117 is pivotally attached by a pin 118 to one head 114 of crank 113, the opposite end of link 117 being pivotally attached by a pin 119 to a bar 120 which extends between the wheels W' and is provided at each end with a triangular ear 121, the ears facing in the same direction. As shown in Fig. 15, upward movement of cylinder 31 will move bar 120 from left to right to rotate the wheels W' in the direction of the arrow, by engagement between ears 121 and a stud 49 on each wheel disc 48. One or both of the wheels may also be provided with a reversible non-return dog, not shown in Fig. 15, but similar to dog 58 of Fig. 7. After cylinder 31 has reached the top of its stroke, and moves downwardly, the underside of bar 120 will slide along and the ears 121 will slip over the next stud 49, so that when piston 31 has reached the lower end of its downward stroke, the ears 121 will drop into place, to engage the next stud 49, in the position shown in Fig. 15. For reversing the direction of drive, it is necessary only to reverse the position of bar 120, and reattach the upper end of link 117 by placing pin 118 in a hole 122 in the lower half of double head 114 of crank 113 which will move pin 119 and the lower end of link 117 to the dotted position 119'. It will be understood, of course, that a hole at the position 119' is not necessary in bar 120, but only that the hole in which pin 119 is disposed will be at position 119' when bar 120 is reversed in position. As will be evident, this will cause bar 120 to move in the opposite direction when cylinder 31 moves upwardly and downwardly, thus driving the wheels W' and the support of Fig. 15 in the opposite direction. If desired, the valve 30' of Fig. 15 may be controlled by the springing or bending of the distributing pipe D at one side only of the support, such as through a wire or rod 124 of Fig. 16 attached at one end to a collar 125 mounted on pipe D at a suitable distance from the support and connected to the outer end of a rod 126, pivoted at its inner end on a collar 127, also attached to the pipe D. The opposite end of wire 124 is attached to one arm of a right angle lever 128 pivoted on the upper end of a post 129 which is mounted on angle 111. The opposite arm of lever 128 is connected to an upright lever 130 provided with a weight 131 at its lower end, which equalizes the tendency for the valve to be opened or closed when the tower leans forwardly or rearwardly in passing over uneven ground. Lever 130 is connected by a rod 132 and a turnbuckle 133 with handle 71' of valve 30'. The turnbuckle 133 is preferably adjusted so that when the pipe D is exactly straight between the support involved and the next adjacent support, the position of valve 30' is such that approximately the desired rate of travel is being produced. Thus, as pipe D springs or bends in either direction, the weight 131 will cause the valve to be opened or closed, as the case may be, but will provide sufficient leeway in the connection so that the valve and associated parts will not be damaged should the pipe, at collar 125, move ahead or behind the support a distance further than the usual movement of valve handle 71' will accommodate. A micro-switch 73' may be mounted on a bracket 74' extending from pipe D, and the depending operating lever 72' thereof adapted to be engaged by the valve handle 71, to open the micro-switch 73' and stop the pump motor in the event that the support involved moves too far ahead (or behind) the next support. Since each of the supports, except the last one at the outer end of the pipe, may be provided with a micro-switch safety control, actuated through the speed control means, if one support gets too far behind (or ahead), then the next support will be too far ahead (or behind), so that stopping for undue movement of a particular support in only one direction, either ahead or behind, may be satisfactory.

As illustrated in Figs. 17–20, the valve V may comprise a housing 135 having an upper vertical passage therein through which a valve rod 136 is adapted to move; a central passage 137 which is larger than rod 136 and accommodates a spring 138; and an enlarged lower passage 139, the lower end of which may be closed by a plug 140. The housing has an outlet connection 141 leading to the central passage 137 and to which the discharge line 76 of Fig. 6 is connected; and a connection 142 which leads to lower passage 139 and is connected to cylinder 31 and piston rod 32, as by a nipple 143 of Fig. 9, to supply water to and drain water from the cylinder. Plug 140 is provided with a passage 144 and a connection 145 to which the supply line 29 of Figs. 4 and 9 may be connected. Spring 138 presses a disc 146 and a sealing washer 147 against the upper end of passage 137, and bears at its lower end against the top of a mushroom type valve disc 148, below which is a frustro-conical valve 149, extending downwardly from disc 148. The disc 148 and frustro-conical valve 149 may be formed integrally with valve rod 136, or may be separate parts attached to the rod. A seat 150 for the upper surface of valve disc 148 is formed at the lower end of central passage 137, while a seat 151 for valve 149 is formed at the upper end of passage 144 of plug 140. As will be evident from Fig. 18, when the disc 148 engages seat 150, the valve 149 will be spaced from its seat 151, so that water from inlet 145 will flow through passages 139 to connection 142 and thence to the interior of the cylinder 31, the cylinder thereby being forced upwardly along the piston rod 32. However, when the valve V is in the position of Fig. 17, with valve 149 engaging its seat 151, water will no longer flow through inlet 145 and disc 148 will be spaced from its seat 150, so that instead the cylinder 31 will be connected through passage 139 and 137 to discharge connection 141, thereby permitting the water to drain from the cylinder 31 and the cylinder to move down along piston rod 32.

Figure 17:
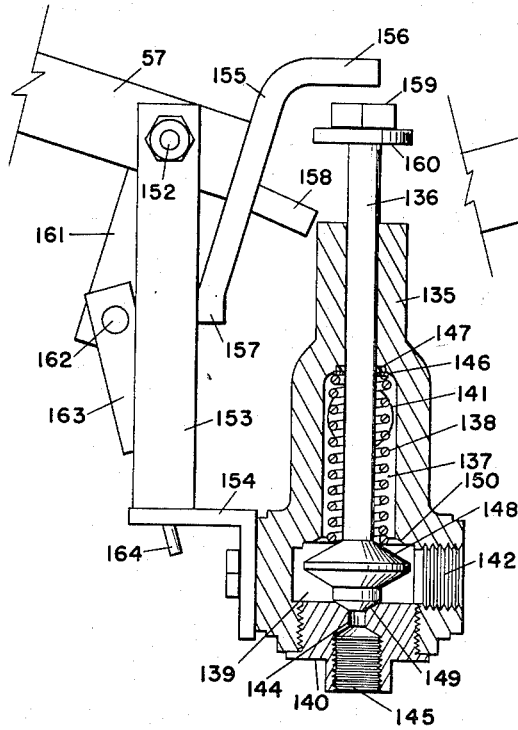
Fig. 17 is a vertical section of a control valve of Figs. 4 and 6, in closed position.
Figure 18:
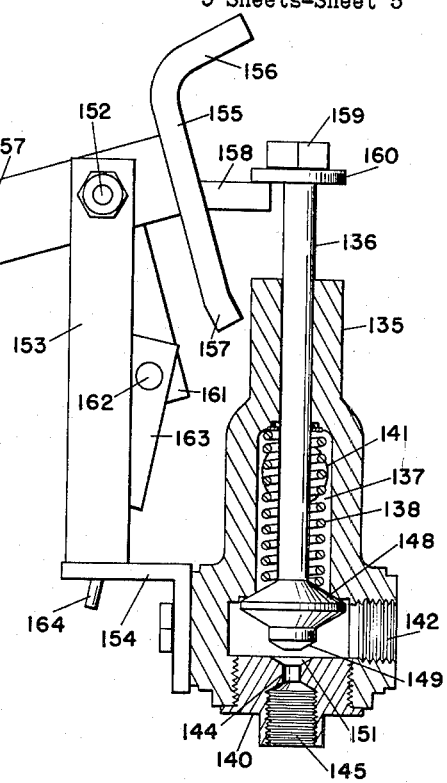
Fig. 18 is a vertical section of the control valve, in open position.
Figure 19:
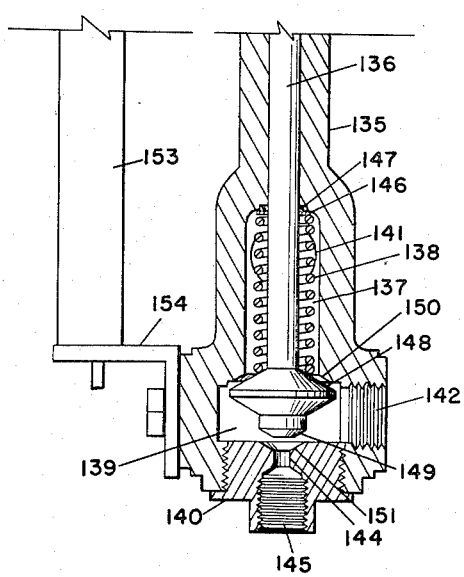
Fig. 19 is a fragmentary vertical section of the control valve, in an intermediate position.

Preferably, the valve V is constructed so that the rod 136 will move quickly between the positions of Figs. 17 and 18 but will not be forced against either seat 150 or 151 with sufficient impact to cause damage to the seat or to other parts of the valve. It will be noted that the pressure of spring 138 tends to move the valve rod 136 downwardly. Thus, when the valve rod 136 is moved upwardly, as when the valve seat 150 is being closed, the spring 138 provides a cushioning effect. However, when the valve rod 136 is being moved in the opposite direction, the pressure of spring 138 may be such that, as soon as disc 148 separates from its seat 150, such pressure is sufficient to move the valve 149 to its seat 151. The valve operating lever 57 may be pivoted on a pin 152 at the upper end of two upright laterally spaced bracket arms 153 mounted on an angle 154, conveniently attached to the lower portion of the housing 135. The lever 47 is further provided at its inner end with a bracket 155 attached thereto, whose upper end of arm 156 extends at almost right angles thereto and whose lower end 157 is slightly bent or bevelled on the rear side. In addition, a bar 158 extends forwardly from the end of lever 57, at a slight angle thereto, the bar 158 being conveniently attached to bracket 155 and the latter attached to the end of lever 57 in a suitable manner, as by welding. The upper end of valve rod 136 may be provided with a head 159 and a flange 160, the latter of which may conveniently be formed by a washer, welded or otherwise suitably attached to the underside of the head 159. With the parts of the valve V in the position of Fig. 17, lever 57 being in an upper position, when the cylinder 31, as in Fig. 4, reaches its lower position, the push rod 54 will be moved downwardly by engagement of the bracket 55 with the lower stop 56' on rod 54, thus moving the lever 57 from the position of Fig. 17 toward the position of Fig. 18. As lever 57 thus pivots downwardly, the bar 158 will engage the underside of flange 160 and move the valve rod to the position of Fig. 18, in which the pressure of water against the underside of the valve holds it closed. The parts are so proportioned that the bar 158 remains in engagement with the flange 160. After the water has drained from the cylinder, and the cylinder has moved upwardly to the full position of Fig. 4, the bracket 55 will engage the upper stop 56 on rod 54, thereby pulling the outer end of lever 57 upwardly, and moving the arm 156 downwardly into engagement with head 159 of rod 136. Preferably, such pivotal movement of lever 57 terminates in the position of Fig. 17, in which the lower end of 157 of bracket 155 engages the bracket arms 153 and prevents the arm 156 from pushing against head 159 of rod 136 further. The position of rod 136, disc 148 and valve 149 shown in Fig. 19 is an instantaneous position when the lever 57 and arm 156 are in the position of Fig. 17, with arm 156 starting to lose contact with the head 159 of rod 136 and rod 136 moving downwardly in the direction of the arrow of Fig. 19. From the position of Fig. 19 to the position of Fig. 17, the rod 136 is moved downwardly merely by the pressure of spring 138, and too sharp an impact of valve 149 against its seat may be avoided.

Figure 20:
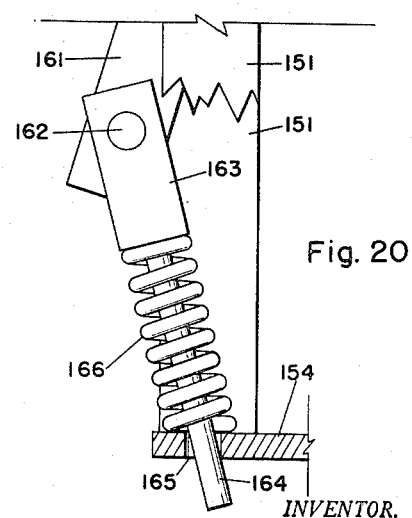
Fig. 20 is an enlarged vertical section of a portion of the operating parts for the control valve, in the position of Fig. 17, certain parts being broken away to show others more clearly.

The movement of lever 57 between the positions of Figs. 17 and 18 is preferably accomplished in a positive manner, as by a snap action arrangement which may include a downwardly extending leg 161 of lever 57, as in Fig. 20, pivotally attached at its lower end by a pin 162, to a fork 163 formed at the upper end of a rod 164 which extends through a hole 165 in the upper leg of angle 154 while a coil spring 166 surrounds rod 164 bearing at its upper end against fork 163 and at its lower end against angle 154. As will be evident, with the lever 57 in the position of Fig. 17, leg 161 of lever 57, fork 163 and rod 164 will be in the position shown in Fig. 20. However, as the lever 57 is moved downwardly, the leg 161 and the rod 164 will be moved to an aligned position or center, thereby further compressing spring 166. As soon as leg 161 and rod 164 are moved slightly past center, the pressure of spring 166 will tend to snap the lever to the position of Fig. 18, thereby also assisting in moving valve rod 136 upwardly against the pressure of spring 138. Similarly, with the valve lever 57 in the position of Fig. 18, when the outer end of lever 57 is moved upwardly, the spring 166 will be further compressed by movement of the leg 161 and rod 164 to center, and a slight movement past center will permit the spring 166 to snap the lever 57 and the parts attached thereto to the position of Fig. 17.

From the foregoing, it will be evident that the sprinkling and irrigation apparatus of this invention, and also the special control valve particularly adapted to be utilized therein, fulfill to a marked degree the requirements and objects hereinbefore set forth. The provision of a stationary piston rod and a cylinder movable thereon, simplifies the construction and design of the water actuated drive, while the provision of a limit switch adapted to stop a pump or the like, when one or more pipe sections become too far out of alignment, permits the apparatus to be stopped when a situation requiring correction occurs. This is of particular advantage in the case of apparatus which is to be left running for days, or perhaps weeks, at a time, since a temporary stoppage for a few hours is generally not particularly disadvantageous, whereas continued operation might cause the distributing pipe to be broken, or other serious damage to occur. In addition, in the event that the water supply should fail, or become too low for successful operation, the water pump again may be stopped by a tank, float and switch, as described, which are responsive to the amount of water discharged from one of the support drives. The provision of an upper wire extending between all of the supports permits the pipe to be supported adequately by a series of inclined wires, while a system of lateral bracing, such as that described, tends to distribute bending over a distance along the pipe rather than causing a possible concentration at one point. Nevertheless, the lateral wire bracing arrangement permits the pipe to flex or bend between supports, whenever one of the supports gets ahead of or behind an adjacent support, sufficient to control of the speed of the drive at a particular support in accordance therewith. As indicated previously the top wire extending between all supports also permits the overhanging end of the pipe beyond the last support, to be supported adequately without requiring an additional wheel or support at such end. The provision of the preferred levers and stud engaging arms or bars, as illustrated and described with greater particularly herein, permits the direction of movement to be reversed with ease, and also provides a simple yet positive drive arrangement. It will be understood, of course, that other features, described in greater detail hereinbefore, also contribute to the effectiveness of operation of the apparatus.

It will be understood that variations in construction and operation, in addition to those previously described, may be utilized. For instance, in connection with the drive to the wheels W or W', the discs 48 may be omitted, and the laterally extending studs 49 welded or otherwise attached directly to the rim of each wheel W. In such case, the studs may also act as lugs to provide additional traction in soft ground, along the ground-engaging portion of the wheel. Also, the distributing pipe may be moved down a field from one end to the other, in which case a ditch may extend along the edge of the field, and water pumped out of the ditch, with the pump mounted on the end support adjacent the ditch. Or, a flexible hose may be connected to successive connections of a supply pipe extending along the edge of the field. In such event, one end support would be set to control the speed and one of the end supports would run in a guide ditch, parallel to the supply pipe or to the supply ditch. The intermediate supports would maintain the pipe in alignment and a special control wire from the support at the guide ditch to the support at the opposite end, such as from a shoe in the guide ditch, spaced ahead of and behind the drive wheel at the speed control support. When an electric or gasoline motor or the like is utilized as power for the drive means at the various supports, the control device, preferably at each intermediate support, may be suitably connected to the drive means at the particular support. Also, the safety device, which is responsive to the movement of an intermediate support relative to another support greater than a predetermined extent, may be connected in an electrical circuit which terminates the supply of water to the distributing pipe, which circuit may also, if desired, be connected so as to shut off the electric or gasoline motor or the like, when one of the safety switches is actuated.

Although a specific embodiment of this invention, and certain variations and alternatives therein have been described with particularly, it will be understood that other embodiments may exist and various changes made therein, all without departing from the spirit and scope of this invention.

What is claimed is:

1. In self-propelled sprinkling and irrigation apparatus for a relatively large section of land or the like, which includes a distributing pipe movable along a predetermined path on said land section; means for supplying water to said distributing pipe, a plurality of supports disposed at spaced positions along said distributing pipe, a plurality of discharge nozzles spaced along said distributing pipe for spraying water onto the land as said distributing pipe moves, drive means at said supports, and a control device at an intermediate support for controlling said drive means in accordance with the springing or bending of said pipe as said intermediate support moves ahead or behind another support, the improvement which comprises an electrical control circuit for stopping the flow of water and stopping said drive means; a switch in said circuit and disposed at said intermediate support, said switch stopping said drive means and the flow of water automatically when actuated; and a connection between said control device and said switch for actuating said switch upon movement of said support relative to another support greater than a predetermined extent.

2. In sprinkling and irrigation apparatus for a relatively large section of land or the like, which includes a distributing pipe movable along a predetermined path on said land section; means for supplying water to said distributing pipe, at least one support for said distributing pipe, and a plurality of discharge nozzles spaced along said distributing pipe for spraying water onto the land as said distributing pipe moves, the improvement which comprises water actuated drive means at said support including a stationary piston rod and a cylinder movable upwardly and downwardly on said piston rod; and a valve device for controlling the flow of water to and from said piston rod in accordance with the position of said cylinder, said valve device including a body having an inlet passage, an outlet passage and a connection to said piston rod, a valve rod movable longitudinally in said housing and provided with a pair of valves controlling the flow between said inlet and said connection, and said outlet and said connection, respectively, a spring urging said valve rod in a direction to seat one of said valves, and a lever having means for moving said rod in a direction against said spring and to seat the other said valve and additional means for moving said rod only a portion of the distance from a position in which the other said valve is seated toward a position in which the one said valve is seated.

3. A valve device comprising a body having an inlet passage, an outlet passage and a connection through which flow is to be controlled; a valve rod movable longitudinally in said housing and provided with a pair of valves controlling the flow between said inlet and said connection, and said outlet and said connection, respectively; a spring urging said valve rod in a direction to seat one of said valves; a lever having means for moving said rod in a direction against said spring and to seat the other said valve, and additional means for moving said rod only a portion of the distance from a position in which the other said valve is seated toward a position in which the one said valve is seated; and snap-action means for positively actuating said lever in each direction of movement.

4. A valve device comprising a body having a central passage, a larger passage at the lower end, an inlet connection leading to said central passage, and a connection at one side and leading to said larger passage; a plug closing the lower end of said lower passage and provided with an outlet connection and a lower valve seat in said lower passage, said body having an upper valve seat in said lower passage at the lower end of said central passage; a valve rod movable longitudinally in said housing and extending from the upper end thereof; a valve disc on said valve rod adapted to engage said upper valve seat, the lower end of said valve rod having a valve adapted to engage said lower seat; a spring in said central passage surrounding said valve rod for uring said rod in a direction to seat said lower valve; and a lever having an arm for engaging said valve and for moving said rod upwardly against said spring and to seat said valve disc, a bracket for engaging said rod to move said rod downwardly, and a stop for limiting the movement of said lever so as to moves said rod only a portion of the distance from a position in which said valve disc is seated toward a position in which the said lower valve is seated.

5. A valve device as defined in claim 10, wherein the extending upper end of said valve rod is provided with a laterally extending flange; said lever is pivotally mounted on the upper end of a bracket having a pair of spaced upwardly extending arms, said lever being movable between said arms and having a downwardly extending leg; a bracket is attached to the end of said lever, said bracket having an upper arm having an inclined end adapted to engage the upper end of said valve rod and a lower end adapted to engage said lever supporting bracket to limit downward movement of said inclined end; an arm attached to said bracket and extending outwardly from said lever and inclined thereto, for engaging the underside of said rod flange; a yoke having a rod extending downwardly therefrom and pivotally attached to the lower end of said lever leg, said rod extending through a hole in a support for said bracket arms; and a spring surrounding said yoke rod and bearing at one end against said yoke and at the other end against said bracket support.

6. In self-propelled sprinkling and irrigation apparatus for a relatively large section of land or the like, which includes a central water supply pipe, a distributing pipe connected to said central supply pipe and movable around said central pipe as an axis, a plurality of supports disposed at spaced positions along said distributing pipe for spraying water onto the land as said distributing pipe moves around, drive motors at said supports providing reciprocatory motion, the improvement which comprises a pair of spaced drive wheels at each support, each provided with a central disc on one side and said disc having a plurality of laterally extending studs disposed in a circle about the axis of said wheel; a lever connected to said drive motor at each support and pivoted at its opposite end on said support, said lever having a head disposed above and below the pivot point; a link adapted to be pivotally attached at its upper end to one of said heads; and a bar pivotally attached to said lever and provided at each end with a generally triangular ear for engaging a stud of the respective disc to rotate said wheels when moved in one direction, said ears facing in the same direction and being sldiable over said studs when said bar is moved in the opposite direction, and said bar being reversible to drive said wheels in the opposite direction when said link is pivoted on the other head.

7. In self-propelled sprinkling and irrigation apparatus for a relatively large section of land or the like, which includes a distributing pipe movable along a predetermined path on said land section; means for supplying water to said distributing pipe, at least one support for said distributing pipe, a plurality of discharge nozzles spaced along said distributing pipe for spraying water onto the land as said distributing pipe moves, drive means at said support, and a pivoted lever connected to said drive means, the improvement which comprises at least one drive wheel at said support and provided with a plurality of laterally extending studs disposed in a circle about the axis of said wheel; and an arm pivotally attached at its upper end to said lever and provided at one side of its lower end with a shoulder for engaging a stud and a wide angle notch above said shoulder.

8. In self-propelled sprinkling and irrigation apparatus for a relatively large section of land or the like, which includes a distributing pipe movable along a predetermined path on said land section; means for supplying water to said distributing pipe, a plurality of supports disposed at spaced positions along said distributing pipe, a plurality of discharge nozzles spaced along said distributing pipe for spraying water onto the land as said distributing pipe moves around, water actuated drive means at said supports, means for supplying water from said distribution pipe to said drive means, and a pipe for conveying discharged water from said drive means, the improvement which comprises an electrical control circuit for stopping the flow of water; a switch in said circuit and disposed at one support; and means responsive to the flow of discharge water at said support for actuating said switch to stop said flow when the same is reduced to less than a predetermined extent.

9. In self-propelled sprinkling and irrigation apparatus, as defined in claim 8, wherein said discharge flow responsive means comprises a tank; a float in said tank; a rod connected to said float; a movable arm on which said switch is mounted, said rod being adapted to pull said arm downwardly to actuate said switch upon a predetermined fall of said float; a regulating valve connected to the lower end of said tank; and a water line connected to said tank adjacent the upper end thereof and leading from said discharge pipe.

10. In self-propelled sprinkling and irrigation apparatus for a relatively large section of land or the like, which includes a water supply pipe, a distributing pipe connected to said supply pipe and movable along a predetermined path on said land section, a plurality of supports disposed at spaced positions along said distributing pipe, and a plurality of discharge nozzles spaced along said distributing pipe for spraying water onto the land as said distributing pipe moves around, the improvement which comprises a tower structure at each support; a top wire connecting the tops of said towers; slanting wires extending from each tower to spaced connections to said distributing pipe; a transverse spar extending horizontally to the front and rear from said distributing pipe at a point centrally between each pair of supports; a shorter horizontal transverse spar between each support and said longer spar; a pair of outer horizontal wires extending from said pipe at a support to the opposite ends of said longer spar and then to said pipe at the next support; and a pair of inner horizontal wires extending from said pipe at a support to the opposite ends of the adjacent shorter spar, then crossing to the opposite ends of said longer spar, then crossing again to the opposite ends of said shorter spar adjacent the next support, and then to said pipe at said next support.

11. In self-propelled sprinkling and irrigation apparatus for a relatively large section of land or the like, which includes a distributing pipe movable along a predetermined path on said land section; means for supplying water to said distributing pipe, at least one support for said distributing pipe, a plurality of discharge nozzles spaced along said distributing pipe for spraying water onto the land as said distributing pipe moves, drive means at said support providing reciprocatory motion, and a pivoted lever connected to said drive means, the improvement which comprises a pair of drive wheels at said support provided with a plurality of laterally extending studs disposed in a circle about the axis of said wheel; and an arm pivotally connected with said lever and provided on the lower side of each end with a projection for engaging said studs.

12. In self-propelled sprinkling and irrigation apparatus for a relatively large section of land or the like, which includes a distributing pipe movable along a predetermined path on said land section, means for supplying water to said distributing pipe, a plurality of supports disposed at spaced positions along said distributing pipe, a plurality of discharge nozzles spaced along said distributing pipe for spraying water onto the land as said distributing pipe moves, drive means at said supports, and a control device at an intermediate support for controlling said drive means in accordance with the springing or bending of said pipe as said intermediate support moves ahead or behind another support, the improvement which comprises an electrical control circuit for stopping the flow of water and stopping said drive means; a switch in said circuit and disposed at said intermediate support, said switch stopping said drive means and the flow of water when actuated and being provided with an operating lever; and said control device including a box normally positioned centrally with respect to said lever and movable to engage said lever with one of the opposite ends thereof upon movement of said support exceeding a predetermined amount ahead or behind relative to an adjacent support.

13. In self-propelled sprinkling and irrigation apparatus for a relatively large section of land or the like, which includes a distributing pipe movable along a predetermined path on said land section, means for supplying water to said distributing pipe, a plurality of supports disposed at spaced positions along said distributing pipe, a plurality of discharge nozzles spaced along said distributing pipe for spraying water onto the land as said distributing pipe moves, drive means at said supports, and a control device at an intermediate support for controlling said drive means in accordance with the springing or bending of said pipe as said intermediate support moves ahead or behind another support, the improvement which comprises an electrical control circuit for stopping the flow of water and stopping said drive means; a switch in said circuit and disposed at said intermediate support, said switch stopping said drive means and the flow of water when actuated; and a connection between said control device and said switch for actuating said switch upon movement of said support relative to another support greater than a predetermined extent, said control device including a wire whose outer end is attached to said pipe at a position at one side of and spaced from said support, a rod pivotally attached at its inner end to said pipe at a position spaced from said support a lesser distance, the outer end of said rod being attached to said wire, a horizontal lever pivoted on a vertical axis and attached to the inner end of said wire, an upright, floating lever connected adjacent its upper end to said horizontal lever and having a weight at its lower end, and a control rod attached to said upright lever at an intermediate position of the latter.

14. In self-propelled sprinkling and irrigation apparatus for a relatively large section of land or the like, which includes a distributing pipe movable along a predetermined path on said land section, means for supplying water to said distributing pipe, a plurality of supports disposed at spaced positions along said distributing pipe, a plurality of discharge nozzles spaced along said distributing pipe for spraying water onto the land as said distributing pipe moves, drive means at said supports, and a control device at an intermediate support for controlling said drive means in accordance with the springing or bending of said pipe as said intermediate support moves ahead or behind another support, the improvement which comprises an electrical control circuit for stopping the flow of water and stopping said drive means; a switch in said circuit and disposed at said intermediate support, said switch stopping said drive means and the flow of water when actuated, and being provided with an operating lever; and said control device including a wire extending from said support laterally to a spaced point of attachment to said pipe at one side at least of said support, and a box movable by said wire and whose opposite ends engage said switch lever upon movement of said box respectively forwardly and rearwardly to a predetermined extent.

15. In self-propelled sprinkling and irrigation apparatus for a relatively large section of land or the like, which includes a distributing pipe movable along a predetermined path on said land section, means for supplying water to said distributing pipe, a plurality of supports disposed at spaced positions along said distributing pipe, a plurality of discharge nozzles spaced along said distributing pipe for spraying water onto the land as said distributing pipe moves, drive means at said supports, and a control device at an intermediate support for controlling said drive means in accordance with the springing or bending of said pipe as said intermediate support moves ahead or behind another support, the improvement wherein said control device includes a member whose outer end is attached to said pipe at a position at one side of and spaced from said support; a rod attached at its inner end to said pipe at a position spaced from said support a lesser distance, the outer end of said rod being connected to said member; a first pivoted lever attached to the inner end of said member; a second pivoted lever connected to said first lever; and a control rod attached to said second lever.

16. In self-propelled sprinkling and irrigation apparatus, the improvement defined in claim 15, wherein said first lever is provided with angularly disposed arms, with one arm being connected to the inner end of said wire and the other arm being connected to said second lever.

17. In self-propelled sprinkling and irrigation apparatus for a relatively large section of land or the like, which includes a distributing pipe movable along a predetermined path on said land section; means for supplying water to said distributing pipe, at least one support for said distributing pipe, a plurality of discharge nozzles spaced along said distributing pipe for spraying water onto the land as said distributing pipe moves, drive means at said support, and a pivoted lever connected to said drive means, the improvement which comprises at least one drive wheel at said support and provided with a plurality of laterally extending studs disposed in a circle about the axis of said wheel; an arm pivotally attached at its lower end to said lever and provided at one side of its lower end with a shoulder for engaging a stud and a wide angle notch above said shoulder; a reversible dog having an angular point at each end pivotally mounted on said support so that one end of said dog will engage a stud to prevent reverse rotation of said wheel, said points being disposed on the inside so as to slide over the next stud as said wheel is rotated by said arm; and an off-center spring pressed lever for urging one end of said dog toward said studs, said spring lever being reversible with said dog.

18. In self-propelled sprinkling and irrigation apparatus for a relatively large section of land or the like, which includes a distributing pipe movable along a predetermined path on said land section; means for supplying water to said distributing pipe; a plurality of supports disposed at spaced positions along said distributing pipe; a plurality of discharge nozzles spaced along said distributing pipe for spraying water onto the land as said distributing pipe moves, drive means at said supports, a control device at an intermediate support for controlling said drive means in accordance with the springing or bending of said pipe as said intermediate support moves ahead or behind another support, the improvement which comprises electrically controlled means for terminating the supply of water to said distributing pipe; an electrical circuit which controls said water supply terminating means and including a switch at said intermediate support; and means operatively associated with said control device for actuating said switch and thereby terminating the supply of water to said distributing pipe upon movement of said intermediate support relative to another support greater than a predetermined extent.

19. In an overhead irrigating device for watering an area of ground: a plurality of laterally spaced tractors; transverse water distributing piping supported by said tractors; water delivery members connected to said piping at spaced points therealong for delivering water to the ground; means for delivering a supply of water to said piping; means operative to effect movement of said tractors along their respective lines of travel so as to move said piping over the surface of the ground; and means acting in response to disalignment of one of said tractors forwardly or rearwardly of the remaining tractors to render said irrigating device inactive.

References Cited in the file of this patent

UNITED STATES PATENTS

| | | |
|---|---|---|
| 1,060,474 | McAuley | Apr. 29, 1913 |
| 1,541,757 | Allen | June 9, 1925 |
| 1,554,453 | Matschull | Sept. 22, 1925 |
| 1,683,213 | Te Pas | Sept. 4, 1928 |
| 1,937,246 | Reedy | Nov. 28, 1933 |
| 2,394,769 | Heckethorn | Feb. 12, 1946 |
| 2,570,434 | Dow | Oct. 9, 1951 |
| 2,604,359 | Zybach | July 22, 1952 |
| 2,628,863 | Maggart | Feb. 17, 1953 |
| 2,726,895 | Behlen | Dec. 13, 1955 |